United States Patent [19]
Crane et al.

[11] Patent Number: 5,929,125
[45] Date of Patent: *Jul. 27, 1999

[54] METHOD FOR PRODUCING HEAVY CRUDE OIL VIA A WELLBORE FROM A SUBTERRANEAN FORMATION AND CONVERTING THE HEAVY CRUDE OIL INTO A DISTILLATE PRODUCT STREAM

[75] Inventors: Steven D. Crane; Gary L. Beer, both of Plano, Tex.

[73] Assignee: Atlantic Richfield Company, Los Angeles, Calif.

[*] Notice: This patent is subject to a terminal disclaimer.

[21] Appl. No.: 08/834,009

[22] Filed: Apr. 12, 1997

[51] Int. Cl.$^6$ .............................. C07C 27/00; B01D 3/00; C10G 3/00; C10G 1/00

[52] U.S. Cl. .......................... 518/702; 208/348; 208/370; 208/427; 208/39; 208/36; 423/650; 423/651; 137/16; 166/267; 166/50

[58] Field of Search .................................. 208/348, 370, 208/427, 39, 36, 92, 86; 166/50, 267; 423/650, 651; 137/16; 518/702

[56] References Cited

U.S. PATENT DOCUMENTS

| | | | |
|---|---|---|---|
| 1,655,603 | 1/1928 | Hanna . | |
| 1,666,597 | 4/1928 | Harnsberger . | |
| 1,727,380 | 9/1929 | Ryder . | |
| 3,617,481 | 11/1971 | Voorhies, Jr. et al. | 208/50 |
| 4,092,825 | 6/1978 | Egan | 60/39.02 |
| 4,218,287 | 8/1980 | Albright et al. | 201/9 |
| 4,226,830 | 10/1980 | Davis | 422/143 |
| 4,309,198 | 1/1982 | Moss | 48/197 R |
| 4,388,877 | 6/1983 | Molayem et al. | 110/342 |
| 4,407,367 | 10/1983 | Kydd | 166/267 |
| 4,420,008 | 12/1983 | Shu | 137/4 |
| 4,531,586 | 7/1985 | McMillen | 166/305 R |
| 4,570,656 | 2/1986 | Matlach et al. | 137/13 |
| 4,844,158 | 7/1989 | Jennings, Jr. | 166/267 |
| 5,015,356 | 5/1991 | Talbert | 208/16 |
| 5,097,903 | 3/1992 | Wilensky | 166/266 |
| 5,355,958 | 10/1994 | Pauls et al. | 166/307 |
| 5,406,786 | 4/1995 | Scharpf et al. | 60/39.05 |
| 5,671,810 | 9/1997 | Hodge et al. | 166/301 |
| 5,795,445 | 8/1998 | Boswell et al. | 201/39 |

FOREIGN PATENT DOCUMENTS 1238598   6/1988   Canada ..................................... 196/83

OTHER PUBLICATIONS

"Air Partial Oxidation" by Surinder M. Marria, Chief Process Engineer, Foster Wheeler USA Corporation, Clinton, New Jersey; for Presentation at the Foster Wheeler Hydrogen Plant Conference, Orlando, Florida, Jun. 1992.

FW Solvent Deasphalting by F.M. Van Tine and Howard M. Feintuch, "Handbook of Petroleum Refining Processes", 2nd Ed., by Robert A. Meyers, Chapter 10.2; McGraw Hill, 1997.

Design Considerations for Utility Size CFB Steam Generators, James E. Maitland, Richards S. Skowyra, Bruce W. Wilhelm,, Power–Gen'94, Dec. 7–9, 1994 7th International Conference & Exhibition for the Power Generating Industries, Book III, pp. 45–47.

Using Low Cost Petroleum Coke to Produce Electricity: Jack L. Cotton, Jr. Sales Manager, Pyropower Corporation, Power–Gen'94, Dec. 7–9, 1994 7th International Conference & Exhibition for the Power Generating Industries, Book III, pp. 72–92.

Six Years of ABB–CE, Petcoke and Fluid Beds: Mike Tanca, Senior Consulting Fluidized Bed Engineer, Combustion Engineering Inc. Power–Gen'94, Dec. 7–9, 1994 7th International Conference & Exhibition for the Power Generating Industries, Book III, pp. 94–116.

Combustion Fossil Power Systems, A Reference Book on Fuel Burning and Steam Generation: Joseph G. Singer, 1981, chapter 245, pp. 19–28.

*Primary Examiner*—Paul J. Killos
*Assistant Examiner*—Jafar Parsa
*Attorney, Agent, or Firm*—F. Lindsey Scott

[57] ABSTRACT

A method for producing a heavy crude oil from a subterranean formation through a wellbore and converting the heavy crude oil into a product distillate hydrocarbon stream and at least one of heat, steam, electricity and synthesis gas by separating distillable components of the heavy crude oil by distillation and converting the residual portion of the heavy crude oil in a fluidized bed to at least one of heat, steam, electricity or synthesis gas. The method also produces diluent hydrocarbons useful in the production and transportation of the heavy crude oil.

17 Claims, 3 Drawing Sheets

METHOD FOR PRODUCING HEAVY CRUDE OIL VIA A WELLBORE FROM A SUBTERRANEAN FORMATION AND CONVERTING THE HEAVY CRUDE OIL INTO A DISTILLATE PRODUCT STREAM

BACKGROUND OF THE INVENTION

1. Field of the Invention

This invention relates to a method for producing a heavy crude oil from a subterranean formation and converting the heavy crude oil into a product distillate hydrocarbon stream suitable for pipelining and optionally a distillate diluent stream and recovering added values from the residual portions of the heavy crude oil as heat, electricity, steam or synthetic liquid hydrocarbons.

2. Description of Related Art

In many parts of the world heavy crude oils are available for production in remote locations. In such remote locations commonly available utilities such as electricity and steam may not be available at all or may be available only in short supply. In such instances, the only option may be to transport the heavy crude oil in a pipeline to a location from which it may be transported to a refinery. Many of the heavier components contained in the heavy crude oil may not be suitable for distillation into distillate hydrocarbon products and may eventually be converted into asphalt, petroleum coke or the like.

In less industrialized parts of the world there may be little market for such products. As a result the products may be of low value in the accessible marketplace. Alternatively, the heavier components may be blended with lighter oils to produce a heavy fuel oil product. Typically, the market value of such heavy fuel oils is relatively low, especially, when the value of the diluent oil as a distillate product is considered.

Such heavy crude oils in some instances, are so viscous that it may be difficult to recover the heavy crude oils from a subterranean formation initially without admixture of a hydrocarbon diluent with the heavy crude oil in the wellbore to reduce the viscosity of the heavy crude oil. Even if the heavy crude oil is at an elevated temperature in the subterranean formation which is high enough to result in a flowable heavy crude oil at the elevated temperature the heavy crude oil remains likely to cool and solidify in upper portions of the producing well, especially during any periods where production is stopped for an interval. Similarly the heavy crude oil is likely to cool and solidify in surface pipelines unless required temperatures and flowrates in the surface pipelines can be maintained. As a result typically distillate hydrocarbon diluents (or occasionally other diluents) are mixed with such heavy crude oils either during or after production and before pipelining to prevent solidification of the heavy crude oil in the pipeline.

Such heavy crude oils contain a much higher percentage of non-distillable components than lighter crude oils. Some such heavy crude oils may contain less than 50 weight percent distillable hydrocarbons.

The production and transportation of such heavy crude oils, especially in remote locations, requires that large quantities of hydrocarbon diluent be transported to the remote location via a pipeline, by truck or the like. This hydrocarbon diluent is expensive relative to the heavy crude oil even without considering the added transportation cost. The diluent when mixed with the heavy crude oil may result in a mixture which still contains as much as 45 weight percent residual (non-distillable) materials. Transportation of this residual material requires a larger pipeline and limits the production and transportation of the desired distillable components of the heavy crude oil. In some oil fields the total production volume may be limited by governmental regulation, pipeline capacity and the like. Desirably the hydrocarbon stream transported consists of distillable products. Even if transported to a refinery the residual materials are of little value and are typically charged to a petroleum coker or used as asphalt and the like. Typically such heavy crude oils also have a high metals content in the residual materials which reduces the value of any petroleum coke produced from such residual materials.

It is also desirable that electricity, steam or both, be available for operations at the remote production sites.

These considerations may result in many heavy crude oils at remote locations being uneconomical to produce and market. Accordingly, a continuing search has been directed to methods for producing such heavy crude oil, at remote sites and delivering valuable distillable hydrocarbons to refineries and the like economically.

SUMMARY OF THE INVENTION

According to the present invention a heavy crude oil is produced from a subterranean formation through a wellbore penetrating the subterranean formation and converted into a distillable hydrocarbon stream and at least one of heat, steam, electricity and synthesis gas by a method comprising: positioning a wellbore to extend from a surface into the subterranean formation; producing the heavy crude oil from the subterranean formation via the wellbore; distilling the heavy crude oil in a crude oil distillation zone to produce a product distillate hydrocarbon stream having a boiling range at atmospheric pressure below about 770° F. and a heavier hydrocarbon stream having a boiling range at atmospheric pressure above about 710° F.; and passing at least a portion of the heavier hydrocarbon stream to a fluidized bed combustion zone for at least partial combustion to produce at least one of heat, steam, electricity and synthesis gas.

By the method of the present invention distillate hydrocarbon diluents which may be required for the production or transportation of the heavy crude oil may be produced as a portion of the distillable hydrocarbon stream.

The distillation may comprise a first distillation followed by a second distillation under a vacuum.

DESCRIPTION OF THE PREFERRED EMBODIMENTS

In the discussion of the FIGURES the same numbers will be used throughout to refer to the same or similar components. Pumps, valves and the like necessary to achieve the described process flows and the like are considered to be well known to the art and have not been shown.

Figure 1:
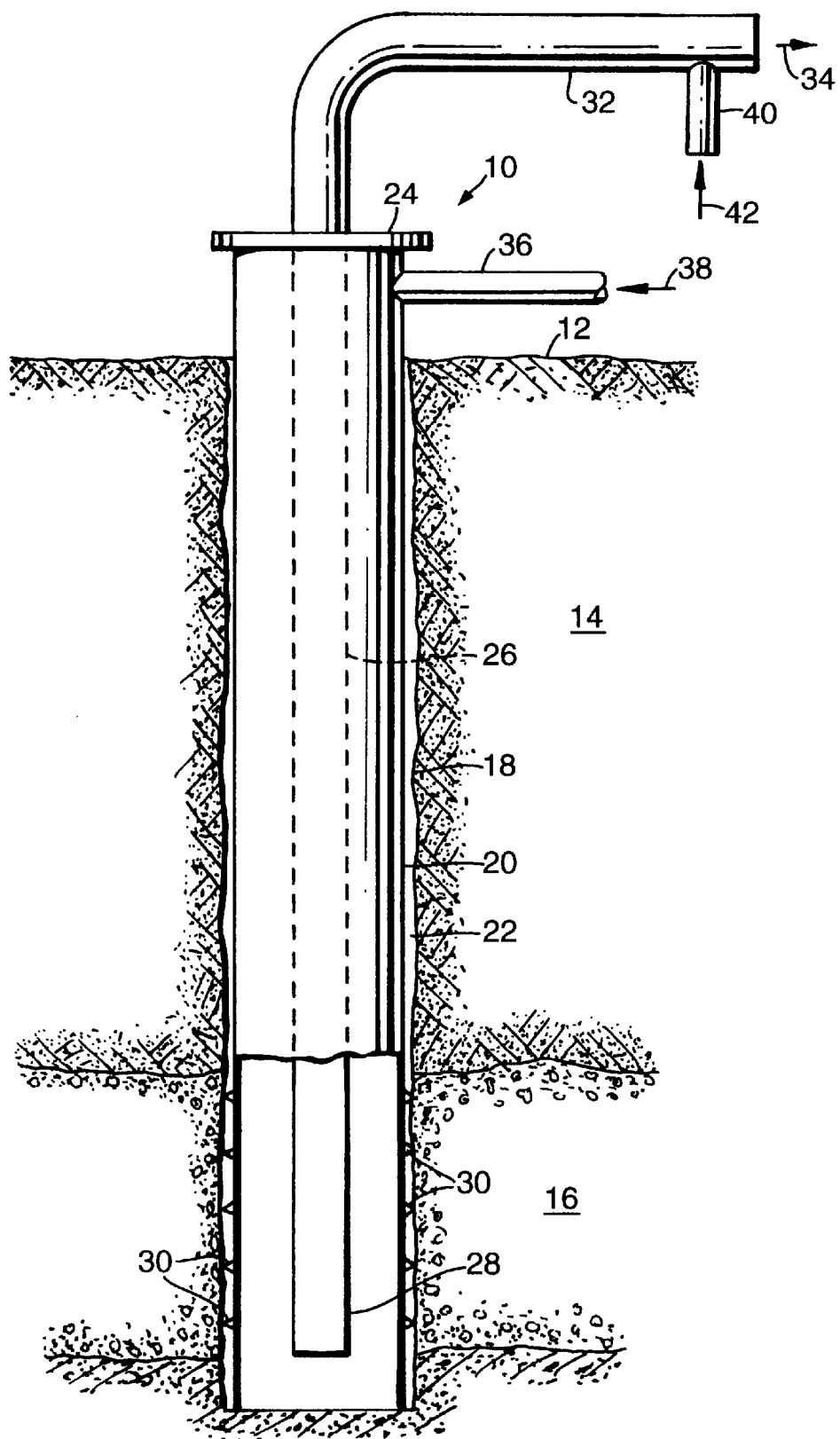
FIG. 1 is a schematic diagram of an oil well penetrating a heavy crude oil-bearing subterranean formation for the production of a heavy crude oil.

In FIG. 1 a well 10 is shown extending from a surface 12 through an overburden 14 and penetrating an oil-bearing formation 16. Well 10 comprises a well bore 18 which includes a casing 20 which is cemented in place with cement 22 through formation 16. Well 10 also includes a well head 24 positioned on casing 20 as known to those skilled in the art for the injection of fluids and the production of fluids from well 10. Well 10 also includes a tubing 26 positioned in casing 20 and extending into formation 16 to a depth sufficient for the production of heavy crude oil from formation 16. The heavy crude oil flows into a lower end 28 of tubing 26 and upwardly through wellbore 10 either under formation pressure or with pumping.

Casing 20 includes perforations 30 penetrating formation 16 so that fluid communication is accomplished between formation 16 and the inside of casing 20. Heavy crude oil recovered through tubing 26 flows upwardly and as shown schematically, flows through tubing 26 into a pipeline 32 for transportation, for further treatment or to a gathering system as shown by an arrow 34.

If necessary a diluent may be injected into casing 20 through a line 36 as shown by an arrow 38 and flows downwardly to admixture with the heavy crude oil recovered through tubing 26. Alternatively, a diluent may be mixed with the heavy crude oil in pipeline 32 by adding the diluent to pipeline 32 via a line 40 as shown by an arrow 42. A variety of techniques can be used for admixing the diluent with either the heavy crude oil in pipeline 32 or the heavy crude oil in well 10. For instance a second tubing (not shown) could be run to the bottom of well 10 for the injection of diluent or the diluent could be added to the heavy crude oil at any point along the length of tubing 26. Such variations are considered to be well known to those skilled in the art and have not been shown. The use of wells such as well 10 for the recovery of heavy crude oils from subterranean formations is considered to be well known to those skilled in the art.

The diluent may be a distillate hydrocarbon diluent which may be produced in a crude oil distillation unit, in a vacuum flasher or by a combination of distillable hydrocarbons from both a crude oil distillation unit and a vacuum flasher. Diesel fuels are frequently a suitable diluent. Any suitable miscible material may be used as a diluent. The diluent is selected based upon the requirements for diluent properties, the value of the material used as a diluent and the like. The diluent stream is passed to heavy crude oil production and may be to a large extent a recycled stream after start-up in the method of the present invention. By the method of the present invention the diluent is generated onsite or near the production site from the heavy crude oil without the need for an imported diluent hydrocarbon. The heavy crude oil production is thus supplied with a hydrocarbon diluent, electricity and heat or steam while producing a distillable hydrocarbon stream suitable for pipelining and at least one of heat, steam, electricity or a synthesis gas as a co-product.

Figure 2:
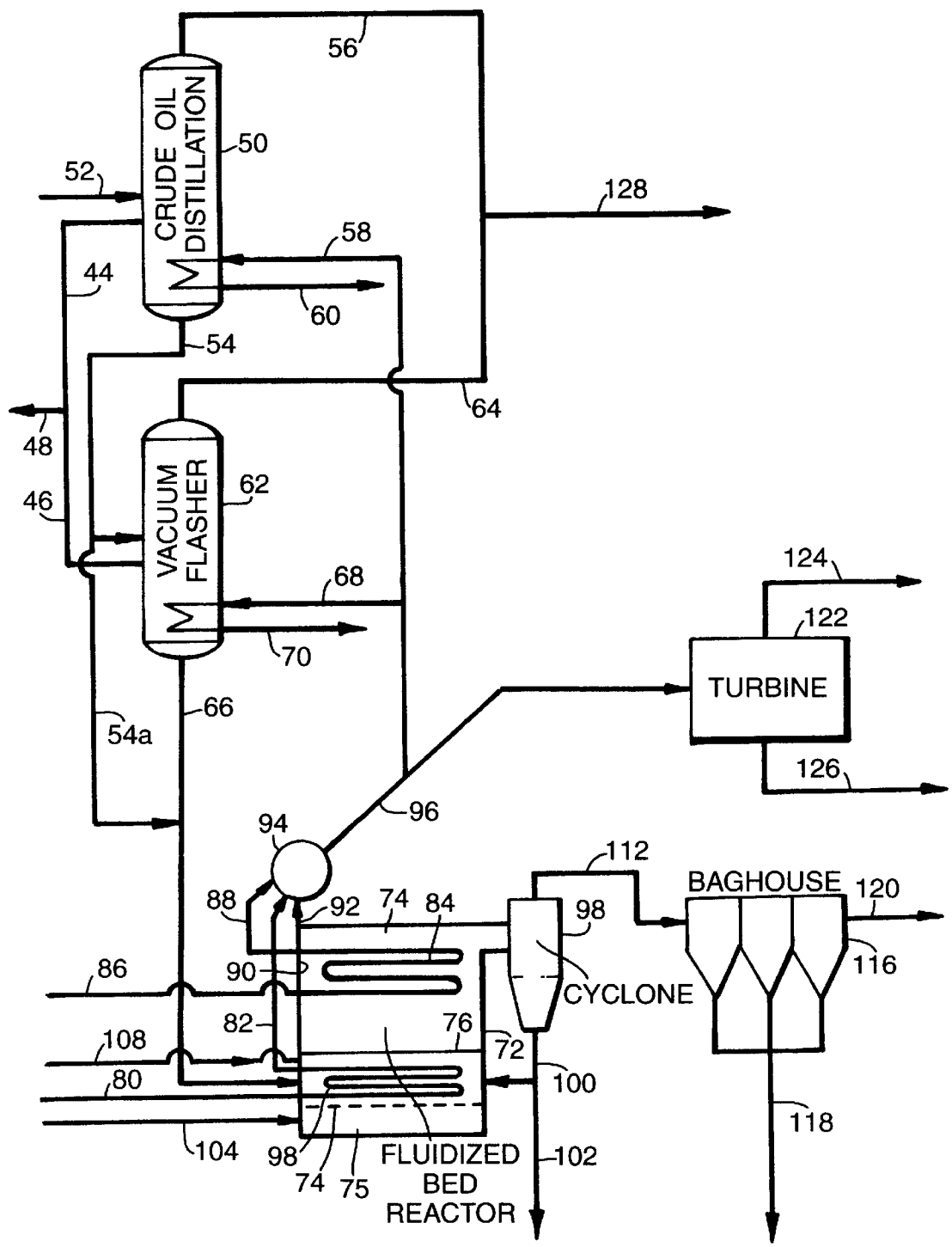
FIG. 2 is a schematic diagram of an embodiment of the process of the present invention wherein a heavy crude oil is distilled in a crude oil distillation unit with the bottoms stream being further distilled in a vacuum flasher with the residue from the vacuum flasher being combusted in a fluidized bed to produce steam a portion of which is used in the distillation and a portion of which is used for the generation of electricity.

In FIG. 2 a crude oil distillation unit 50 is shown. A heavy crude oil stream or a heavy crude oil/diluent mixture is charged to crude oil distillation unit 50 through a line 52 and distilled in unit 50 to produce a distillate hydrocarbon stream recovered through a line 56 and a bottoms stream recovered through a line 54. Steam is supplied to unit 50 via a line 58 to supply heat for the distillation operation with spent steam being recovered through a line 60 and passed to steam recovery, further use as a heating medium, water recovery or the like. While shown as a single stream 56 the distillate hydrocarbons may be recovered as a plurality of streams (not shown).

The distillation in unit 50 typically separates distillable hydrocarbon materials which are readily separable from the crude oil at atmospheric pressure from the heavier portions of the crude oil. The distillation end point is a function of the crude oil feed to unit 50 and a variety of other factors known to those skilled in the art. Typically, the materials recovered as distillates have boiling ranges below about 710° F. to about 770° F. at atmospheric pressure. Such materials include light hydrocarbons and distillate products such as straight run gasoline, kerosene, diesel fuel and the like.

The bottoms stream recovered through line 54 is a heavy hydrocarbonaceous stream which is passed to a vacuum flasher 62 where it is further distilled under a relatively high vacuum i.e. typically from about 2 to 4 inches of water, with additional distillate material being recovered overhead through a line 64. The distillate material recovered through line 64 typically has a boiling range below about 750° F. to about 1100° F. at the reduced pressure in vacuum flasher 62. Such materials are generally referred to as heavy gas oils and are suitably fed to further refining in a unit such as a fluidized catalytic cracking unit, a fixed bed hydrocracking unit or the like.

The heat required in vacuum flasher 62 is supplied by steam supplied via a line 68 with spent steam being recovered through a line 70 and passed to steam recovery, further use a heating medium, water recovery or the like. The heavy residual hydrocarbonaceous stream having a boiling point above about 750° F. to about 1100° F. recovered from vacuum flasher 62 via a line 66 is a stream which is frequently used as asphalt, fed to a delayed petroleum coker to produce petroleum coke, blended with a relatively heavy distillate hydrocarbon stream and marketed as a heavy fuel oil or the like. This stream is of low value relative to the distillate hydrocarbon streams recovered through lines 56 and 64.

The value of the stream in line 66 is even less when the vacuum flasher and crude unit are located at a remote location or in less industrialized parts of the world. In such areas the market for asphalt or petroleum coke is less developed and these materials which are of relatively low value must be transported considerable distances to market. The transportation costs for such materials may constitute a relatively high proportion of their total value in the ultimate market. As a result it is desirable to convert this residual stream into more valuable, more readily transported products or use it to produce products of greater value from the crude oil stream itself. This is accomplished by feeding the residual stream in line 66 to a fluidized bed reactor 72. Fluidized bed reactor 72 may be of a variety of types known to those skilled in the art and may, for instance, comprise a fluidized bed combustion boiler, a circulating fluidized bed or the like. Such units are considered to be well known to those skilled in the art. Some such units are discussed in "Design Considerations for Utility Size CFB Steam Generators," Maitland, James E., Skowyra, Richard S., and Wilhelm, Bruce W., Power-Gen '94, 7th International Conference and Exhibit for the Power Generating Industries, Orange County Convention Center-Orlando, Fla., Dec. 7–9, 1994, pp. 45–47; "Using Low Cost Petroleum Coke to Produce Electricity," by Cotton, Jack L. Jr., Power-Gen '94, 7th International Conference and Exhibit for the Power Generating Industries, Orange County Convention Center-Orlando, Fla., Dec. 7–9, 1994, pp. 72–92; and, "Six Years of ABB-CE, Petcoke and Fluid Beds," Tanca, Mike, Power-Gen '94, 7th International Conference and Exhibit for the Power Generating Industries, Orange County Convention Center-Orlando, Fla., Dec. 7–9, 1994, pp. 93–116.

Fluidized bed reactor 72 shown in FIG. 1 is a schematic diagram of a fluidized bed reactor. The fluidized bed 76 in reactor 72 is of a depth to cover heat exchanger tubes 78 which are positioned to receive water from a line 80 and produce steam through a line 82. The steam produced through line 82 is routed to a steam drum 94. The solids in fluidized bed 76 may be any suitable finely-divided carbonaceous or inorganic material and may be, for instance, finely-divided petroleum coke, finely-divided coal, finely-divided silica, silica-alumina, alumina or the like.

As the residual stream in line 66 is charged to reactor 72 it is anticipated that carbonaceous solids sufficient to maintain the depth of fluidized bed 76 will be formed in bed 76 by thermal decomposition of the residual stream. The residual stream in line 66 is desirably passed directly from vacuum flasher 62 to reactor 72 so that the heat values present in stream 66 are realized in reactor 72. Alternatively, the residual stream may pass through an intermediate storage, heat exchange or the like zone prior to charging the residual stream to reactor 72. Optionally limestone or other calcium-containing material may be charged to fluidized bed 76 via a line 108. Air or other oxygen-containing gas is introduced into a plenum zone 75 beneath fluidized bed 76 via a line 104. As known to those skilled in the art, the air is injected beneath a grid plate 74 which fluidizes bed 76 above plenum 75. Air or other gas is charged to fluidize bed 76 at a rate sufficient to maintain the desired turbulence and combustion in fluidized bed 76. In fluidized bed 76, combustion is generally at a temperature sufficiently low that relatively low amounts of $NO_x$ compounds are formed.

Sulfur oxides formed in bed 76 are absorbed by the calcium-containing material charged through line 108. The fluidized bed may be operated to produce a flue gas resulting from relatively complete combustion of the residual stream in line 66 or a synthesis gas by operation to produce a partially oxidized gaseous stream comprising carbon monoxide and hydrogen. Such variations are considered well known to those skilled in the art.

In either event, considerable heat is produced by the oxidation reactions in fluidized bed 76. Heat values are recovered from the hot gases by heat exchange tubes 84 positioned in the upper portion of fluidized bed unit 72. Water is charged to heat exchange tubes 84 via a line 86 with steam being recovered via a line 88 and passed to stream drum 94.

The walls of reactor 72 are formed of a plurality of heat exchange tubes above fluidized bed 76. These tubes are schematically shown by the numeral 90 and produce steam which is recovered via a line 92 and passed to stream drum 94. It is well known to those skilled in the art that in the event it is desired to produce steam at different temperatures from the different heat exchange tubes a plurality of steam drums 94 can be used.

A portion of the steam recovered from steam drum 94 is passed through a line 96 to a turbine 122 to produce electricity which is recovered through a line 124 and spent steam which is recovered through a line 126. The operation of such turbines is considered to be well known to those skilled in the art. Similarly, the recovery of spent steam and its use to recover additional heating values or water is considered to be well known to those skilled in the art. A portion of the steam from line 96 is used to supply heat via lines 58 and 68 to unit 50 and vacuum flasher 62.

A cyclone 98 is used to separate finely-divided solids which may be entrained from fluidized bed 76 for return to fluidized bed 76 via a line 100. A line 102 is shown for the periodic removal of materials from the finely-divided solids recovered in cyclone 98. The flue gas stream recovered from cyclone 98 may be cooled by heat exchange (not shown) and is passed through a line 112 to a baghouse 116 where remaining finely-divided solids are recovered for disposal through a line 118 with the cleaned flue gas being recovered through a line 120 and passed to discharge.

In some instances additional treatment may be necessary before the flue gas recovered through line 120 can be discharged to the atmosphere, but as discussed previously, when calcium compounds are used in fluidized bed 76 to recover sulfur oxides, the sulfur oxides are reduced to levels sufficient for discharge to the atmosphere.

Sulfur reactive compounds such as limestone and the like used to recover sulfur oxides formed in fluidized bed 76 are generally required to be present in a amount equal to approximately twice the stoichiometric amount necessary to react with the sulfur oxides formed. Additional quantities are effective to further reduce the amount of sulfur oxides emitted from fluidized bed 76.

Similarly the injection of compounds such as ammonia into the hot gas sections of reactor 72 are effective to reduce the amount of nitrogen oxides emitted in the flue gas. As a result the gaseous streams emitted from such fluidized bed units are frequently sufficiently low in pollutant materials that they can be discharged to the atmosphere after passing through a baghouse or other finely-divided solids separation unit.

In FIG. 2 the distillable hydrocarbon streams recovered from unit 50 and vacuum flasher 62 have been combined and passed through a line 128 to a pipeline or other use of the streams. Such streams can be used for further refining to produce distillate products or pipelined or otherwise transported to a refinery at a distant location. The volume of hydrocarbon material passed to the pipeline is greatly reduced by removal of the heavy residual stream and substantially all of the material passed to the pipeline through line 128 is refinable into valuable distillate hydrocarbon products.

Accordingly the practice of the present invention has upgraded a heavy crude oil at a remote location to a valuable pipeline hydrocarbon stream of distillate materials, electricity (at least a portion of which will be frequently be found useful in the crude oil recovery operation at the remote site) and steam which is required for upgrading the heavy crude oil. The unused electricity is readily transmitted by a transmission line to a market for the electricity. The upgrading and production of electricity has been accomplished with a relatively low value hydrocarbon stream which has little if any market value at the site and possibly in the region where the crude oil has been produced.

The hydrocarbon stream produced in unit 50 may be separated into a plurality of streams (not shown). Such streams may constitute light hydrocarbons containing 4 or less carbon atoms, a straight run gasoline stream, kerosene, diesel fuel, and the like. Such streams are readily refined into hydrocarbon products meeting market specifications. As shown in FIG. 2 the distillable hydrocarbons are combined for transportation through line 128 except for distillable hydrocarbons optionally withdrawn via a line 44, a line 46 or both for use in the production or transportation of the heavy crude oil. Distillable hydrocarbons for use as a diluent are passed via a line 48 to heavy crude oil recovery or transportation.

Figure 3:
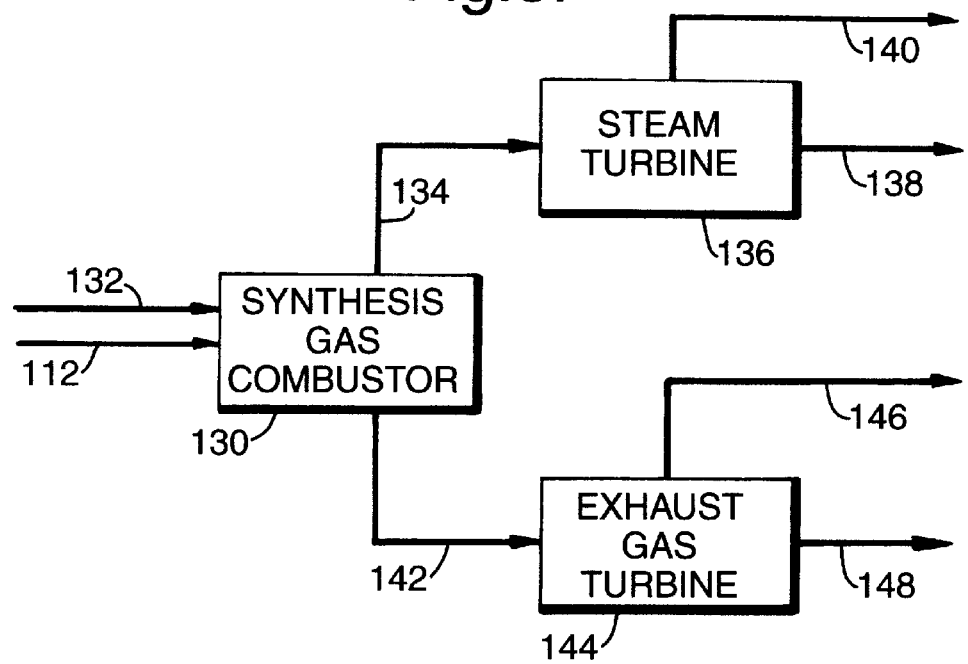
FIG. 3 is a schematic diagram of a variation of the process of the present invention wherein the combustion product stream from the fluidized bed is a synthesis gas stream which is used to produce steam; and, FIG. 4 is a schematic diagram of a variation of the process of the present invention wherein the combustion product stream from the fluidized bed comprises a synthesis gas stream which is used to produce a synthesis gas.

In FIG. 3 a variation of the present invention is shown wherein fluidized bed unit 72 is operated to produce a synthesis gas mixture which is passed via a line 112 to a synthesis combustor 130 with an oxygen-containing stream supplied via a line 132. As well known to those skilled in the art when such beds are operated with limited oxygen a partially oxidized exhaust gas stream is produced. Natural gas may also be used as a second fuel feed to such beds to control the hydrogen to carbon monoxide ratio and produce synthesis gas. The partially oxidized stream comprising a synthesis gas stream may be desulfurized and is then passed to a synthesis gas combustor 130 where it may be combusted to produce additional heat which is recovered as steam through a line 134 and passed to a steam turbine 136 to produce electricity via a line 140 with spent steam being recovered through a line 138. Synthesis gas combustor 130 also produces an exhaust gas stream 142 at a pressure and temperature suitable for use in an exhaust gas turbine 144 to produce additional electricity which is recovered via a line 146 with the exhaust gas being recovered and passed through a line 148 via a heat exchanger (not shown) to baghouse 116 for treatment as discussed previously.

Figure 4:
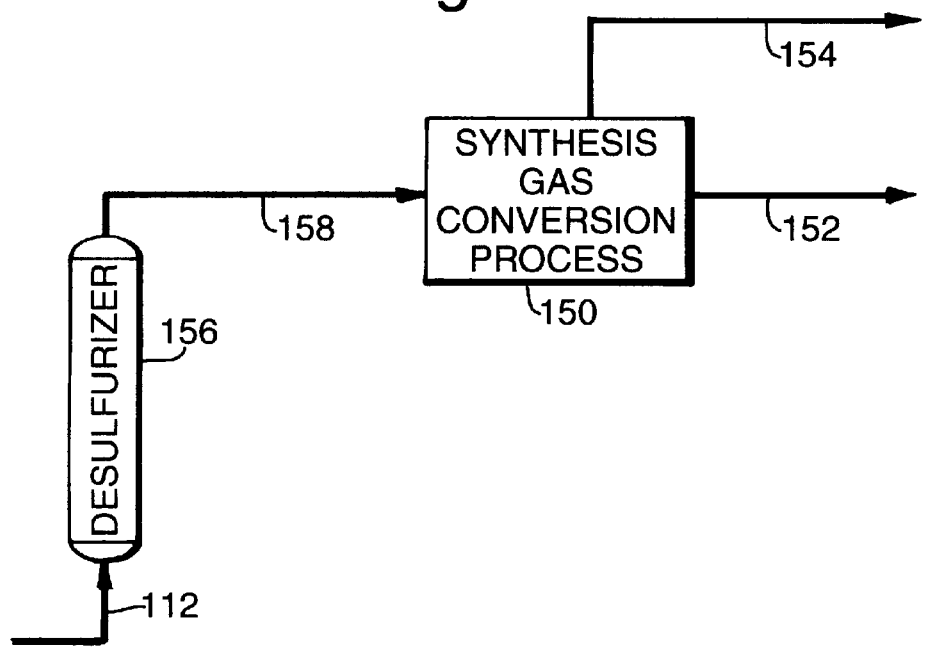

In FIG. 4 the synthesis gas mixture recovered through line 112 is passed through a hot gas desulfurizer 156, such as a zinc oxide bed or the like, a water gas shift process (not shown) or the like to adjust the carbon-hydrogen ratio in the synthesis gas mixture to a desired value and then converted to desirable synthetic hydrocarbon products which may vary from methane to synthetic liquid hydrocarbons such as gasoline and the like. Such processes are considered to be well known to those skilled in the art.

In the synthesis gas conversion process shown schematically at 150 synthetic liquid hydrocarbons are produced and pass through a line 154 to combination with the hydrocarbon stream recovered through line 128. An exhaust gas stream is recovered through a line 152 and may be passed to use as a fuel stream or the like.

In the variations of the method shown the residual heavy hydrocarbonaceous product recovered through line 66 is combusted or partially combusted in fluidized bed reactor 72 to produce valuable products and to supply the energy necessary to operate the remaining process units to upgrade the crude oil. Processes of this type are especially suited for use to upgrade heavy crude oils especially heavy crude oils which may be produced in remote locations. In such instances it may be uneconomical to transport the entire heavy crude oil stream to suitable refining facilities. By the process of the present invention such crude oils can be upgraded on site to produce a valuable distillate hydrocarbon stream and electricity which are both readily transportable to remote markets or refining at existing facilities.

In a further variation of the process of the present invention the heavier hydrocarbon stream recovered through line 54 having a boiling range above about 710° F. may be passed to the fluidized bed combustion reactor 72 via a line 54a without an intervening vacuum distillation step.

The reference to hydrocarbon streams herein is understood to refer to streams which are primarily composed of hydrocarbons. Such streams may include other components such as oxygen, sulfur, nitrogen and various metals such as nickel, vanadium and the like. Such streams are primarily hydrocarbonaceous materials and have been referred to as hydrocarbon or hydrocarbonaceous streams.

By the process of the present invention considerable value has been added to the product distillate hydrocarbon stream by the use of components of the heavy crude oil which are of little value and a diluent distillate stream for use in the production of the heavy crude oil if requires has been provided on site. The present invention is also beneficial to improve refinery operations since heat energy and electrical energy can be produced from a portion of the heavy crude oil stream charged to the refinery which is of little value.

Having thus described the invention by reference to certain of its preferred embodiments it is pointed out that the embodiments described are illustrative rather than limiting in nature and that many variations and modifications are possible within the scope of the present invention. Many such variations and modifications may be considered obvious and desirable to those skilled in the art based upon a review of the foregoing description of preferred embodiments.

Having thus described the invention we claim:

1. A method for producing a heavy crude oil from a subterranean formation penetrated by a wellbore and converting the heavy crude oil at the production site into a product distillate hydrocarbon stream and at least one of heat, steam, electricity or a synthesis gas, the method comprising:

a) producing the heavy crude oil from the subterranean formation via the wellbore;

b) distilling the heavy crude oil in a crude oil distillation zone to produce a first distillate hydrocarbon stream having a boiling range at atmospheric pressure below about 770° F. as the product distillate hydrocarbon stream and a heavy hydrocarbon stream having a boiling range at atmospheric pressure above about 710° F.; and, c) passing the heavy hydrocarbon stream and a sulfur-reactive compound to a fluidized bed combustion zone for at least partial combustion to produce at least one of heat, steam, electricity and a synthesis gas.

2. The method of claim 1 wherein the heavy hydrocarbon stream is distilled at a reduced pressure in a vacuum distillation zone to produce a second distillate hydrocarbon stream having a boiling range at the reduced pressure up to about 1100° F. and a heavier hydrocarbonaceous residual stream having a boiling range above about 750° F. at the reduced pressure.

3. The method of claim 2 wherein the first distillate hydrocarbon stream and the second distillate hydrocarbon stream are combined to produce the product distillate hydrocarbon stream.

4. The method of claim 2 wherein the residual stream is passed to a fluidized bed from the vacuum distillation zone at an elevated temperature.

5. The method of claim 2 wherein the residual stream is combusted in the fluidized bed to produce steam.

6. The method of claim 5 wherein a portion of the steam is used in the crude oil distillation zone and in the vacuum distillation zone.

7. The method of claim 6 wherein a portion of the steam is used to generate electricity.

8. The method of claim 1 wherein a calcium-containing compound is added to the fluidized bed in an amount sufficient to reduce sulfur oxide emissions from the fluidized bed.

9. The method of claim 2 wherein the residual stream is partially combusted in the fluidized bed to produce a synthesis gas stream.

10. The method of claim 9 wherein the synthesis gas stream is combusted to produce steam and an exhaust gas stream.

11. The method of claim 10 wherein the steam is used to drive a turbine to produce electricity.

12. The method of claim 10 wherein the exhaust gas stream is used to drive a turbine to produce electricity.

13. The method of claim 9 wherein the synthesis gas stream is converted into liquid hydrocarbons in a synthesis gas conversion zone.

14. The method of claim 2 wherein distillate hydrocarbon diluent comprising a portion of at least one of the first distillate hydrocarbon stream and the second distillate stream is mixed with the heavy crude oil to facilitate transportation of the heavy crude oil.

15. The method of claim 14 wherein the diluent is mixed with the heavy crude oil in the well.

16. The method of claim 14 wherein the diluent is mixed with the heavy crude oil after production of the heavy crude oil.

17. The method of claim 16 wherein the heavy crude oil is diluted to produce a heavy crude oil/diluent mixture having a viscosity suitable for transportation in a pipeline.

* * * * *